United States Patent
Xu et al.

(10) Patent No.: US 8,824,783 B2
(45) Date of Patent: Sep. 2, 2014

(54) METHOD AND APPARATUS FOR MEASURING VIDEO QUALITY USING AT LEAST ONE SEMI-SUPERVISED LEARNING REGRESSOR FOR MEAN OBSERVER SCORE PREDICTION

(75) Inventors: Feng Xu, Beijing (CN); Zhibo Chen, Beijing (CN); Debing Liu, Beijing (CN); Xiaodong Gu, Beijing (CN)

(73) Assignee: Thomson Licensing, Issy Les Moulineaux (FR)

( * ) Notice: Subject to any disclaimer, the term of this patent is extended or adjusted under 35 U.S.C. 154(b) by 129 days.

(21) Appl. No.: 13/695,060

(22) PCT Filed: Apr. 30, 2010

(86) PCT No.: PCT/CN2010/000600
§ 371 (c)(1),
(2), (4) Date: Oct. 29, 2012

(87) PCT Pub. No.: WO2011/134110
PCT Pub. Date: Nov. 3, 2011

(65) Prior Publication Data
US 2013/0050503 A1 Feb. 28, 2013

(51) Int. Cl.
*G06K 9/62* (2006.01)
*G06K 9/46* (2006.01)
*H04N 17/00* (2006.01)
*G06T 7/00* (2006.01)

(52) U.S. Cl.
CPC .... *H04N 17/004* (2013.01); *G06T 2207/10016* (2013.01); *G06T 2207/20081* (2013.01); *G06T 7/0002* (2013.01); *G06T 2207/30168* (2013.01)
USPC ............................. 382/159; 382/155; 382/190

(58) Field of Classification Search
CPC ..... H04N 17/00; H04N 19/002; G06K 9/627; G06K 9/6276; G06T 7/00
USPC .......................................... 382/155, 159, 190
See application file for complete search history.

(56) References Cited

U.S. PATENT DOCUMENTS 6,643,613 B2 * 11/2003 McGee et al. ................ 702/186
7,492,943 B2 *  2/2009 Li et al. .......................... 382/159

(Continued)

FOREIGN PATENT DOCUMENTS

| CN | 1416651 | 5/2003 |
| CN | 1669338 | 9/2005 |

(Continued)

OTHER PUBLICATIONS

Zhou, Zhi-Hua, and Ming Li. "Semi-Supervised Regression with Co-Training." IJCAI. 2005.*
Hui Li etal "Active Learning for Semi-Supervised Multi-Task Learning", Acoustic Speech and Signal Processing 2009, Apr. 19-24, 2009, pp. 1637-1640.
Search Report dated Feb. 24, 2011.

*Primary Examiner* — Utpal Shah
(74) *Attorney, Agent, or Firm* — Robert D. Shedd; Patricia A. Verlangieri

(57) ABSTRACT

The invention is made in the technical field of video quality measurement. More precisely, the invention is related to mean observer score prediction using a trained semi-supervised learning regressor. That is, a method and apparatus for measuring video quality using a semi-supervised learning system for mean observer score prediction is proposed. Said semi-supervised learning system comprises at least one semi-supervised learning regressor and said method comprises training the learning system and retraining the trained learning system using a selection of test data wherein the test data is used for determining at least one mean observer score prediction using the trained learning system and the selection is indicated by a feedback received through a user interface upon presenting, in the user interface, said at least one mean observer score prediction. Doing so, prediction quality can be improved after re-training at least for the selection.

17 Claims, 3 Drawing Sheets

(56) References Cited

U.S. PATENT DOCUMENTS

| | | | |
|---|---|---|---|
| 8,130,274 B2* | 3/2012 | Okamoto et al. | 348/180 |
| 8,266,083 B2* | 9/2012 | Weston et al. | 706/45 |
| 8,488,915 B2* | 7/2013 | Jayant et al. | 382/309 |
| 8,508,597 B2* | 8/2013 | Bourret et al. | 348/192 |
| 2002/0090134 A1 | 7/2002 | Van Zon | |
| 2004/0012675 A1 | 1/2004 | Caviedes | |
| 2007/0088516 A1* | 4/2007 | Wolf et al. | 702/81 |
| 2008/0143837 A1 | 6/2008 | Okamoto et al. | |

FOREIGN PATENT DOCUMENTS

| | | |
|---|---|---|
| CN | 101036399 | 9/2007 |
| CN | 101282481 | 10/2008 |
| CN | 101616315 | 12/2009 |
| CN | 101695141 | 4/2010 |
| WO | WO2009007133 | 1/2009 |
| WO | WO2009-017464 | 2/2009 |

* cited by examiner

Fig. 1 – prior art

METHOD AND APPARATUS FOR MEASURING VIDEO QUALITY USING AT LEAST ONE SEMI-SUPERVISED LEARNING REGRESSOR FOR MEAN OBSERVER SCORE PREDICTION

This application claims the benefit, under 35 U.S.C. §365 of International Application PCT/CN2010/000600, filed Apr. 30, 2010, which was published in accordance with PCT Article 21(2) on Nov. 3, 2011 in English.

TECHNICAL FIELD

The invention is made in the technical field of video quality measurement. More precisely, the invention is related to mean observer score prediction using a trained semi-supervised learning regressor.

BACKGROUND OF THE INVENTION

With the development of video compression, transmission, and storage, perceptual video quality is of great significance. For instance, determining the quality loss resulting from compression and transportation can be of interest for video distribution quality surveillance or video distribution services with video quality dependent charges.

Most precise and direct way for assessing video quality is subjective quality score assignment. But, subjective assignment is expensive and time-consuming. Thus, objective video quality measurement (VQM) has been proposed as an alternative method, in which it is expected to provide a calculated score as close as possible to the average subjective score assigned by subjects. According to the reference information about the source encoded and transmitted available or not at the decoder side, the objective video quality measurement can be categorized into three types: 1) Full-Reference (FR); 2) Reduced-Reference (RR); 3) No-Reference (NR). Since no reference is required in the NR video quality measurement, the NR methods are in particular useful for, but not limited to, evaluating perceived video quality of a video distorted by transmission.

In NR methods, mapping between objectively detectable artefact features and the prediction of subjective scores is crucial. There is a bouquet of methods in the art for establishing such mapping. For instance some mappings use a fixed formula with trained parameters, most of which are linear or exponential. Or, Artificial Neural Networks are trained to predict mean observer scores (MOS) from objectively detectable artefact features. Although artificial neural networks achieve good results for test data in problems where training and test data are related to similar content, it is not easy to achieve stable performance when extending to wide range of contents.

Further, there are semi-supervised learning methods in which a small quantity of labelled and a large number of unlabeled data can be involved into training together to achieve better performance.

In the prior art semi-supervised learning regression methods, the labelled and unlabelled data are collected and used to train the regressor. Then in the test process, the regressor will not be updated, and the test data will be evaluated.

In order to further improve semi-supervised learning regression methods, Zhi-Hua Zhou and Ming Li proposed in: "Semi-Supervised Regression with Co-Training", IJCAI 2005: 908-916, an algorithm using two k-nearest neighbour regressors with different distance metrics, each of which labelling the unlabelled data for the other regressor during the learning process. The final prediction is made by averaging the regression estimates of both regressors.

SUMMARY OF THE INVENTION

There is an ongoing effort in the art to provide alternative mean observer score predictors for video quality measurement. In particular, there is an effort for improved alternative mean observer score predictors for video quality measurement.

The invention engages in these efforts and proposes a method for measuring video quality using at least one semi-supervised learning system for mean observer score prediction according to claim 1 and an apparatus according to claim 7.

Said semi-supervised learning system comprises at least one semi-supervised learning regressor and said method comprises the steps of: Training the learning system and retraining the trained learning system using a selection of test data wherein the test data is used for determining at least one mean observer score prediction using the trained learning system and the selection is indicated by a feedback received through a user interface upon presenting, in the user interface, said at least one mean observer score prediction.

Re-training based on a selection of test data allows for re-training the learning system using a part of the test data which has variant or unrelated content. Doing so, prediction quality for said part of test data can be improved after re-training.

In an embodiment, said method further comprises receiving a label trough said interface and using said label for labelling at least a part of the selection for re-training. Labelling the selection of test data used for re-training further improves prediction quality after re-training.

In a further embodiment, re-training further involves training data used for training the learning system. Doing so ensures that re-training does not lead to significantly worsened prediction for other test data not involved in the re-training.

In yet a further embodiment, contribution for re-training of the selection of test data and of the training data is controlled by a first weight factor assigned to the test data and at least a different second weight assigned to the training data. If the training data comprises labelled and unlabelled training data, the labelled and the unlabelled training data can have different or equal weights during re-training. This helps preventing worsened prediction even more. The first weight for the selection of test data can be predetermined or received through the user interface. Further, it can be smaller than the at least a different second weight.

In even yet a further embodiment, the method further comprises determining a distance between two video frames, each of the two video frames being comprised in either the training data or the test data. In said even yet a further embodiment the distance is determined using a distance metrics and at least one of: the first weight factor and the at least a different second weight factor. The first weight factor is used, if at least one of the two video frames is comprised in the test data, the at least a different second weight factor is used, if at least one of the two video frames is comprised in the training data, and both, the first and the at least a different second weight factor are used for determining the distance, if one of the two video frames is comprised in the training data and the other is comprised in the test data.

The method can further comprise the step of determining an observer score estimate for a data instance using a first neighbourhood of k nearest neighbours in the test data and/or at least a second neighbourhood of k nearest neighbours in the training data. If both, the first and the at least a second neighbourhood, are used, the observer score estimate can be determined using the first weight factor and the at least a different second weight factor.

The semi-supervised learning system can comprise two semi-supervised learning regressors, wherein the two regressors can be co-training style regressors. Then, the method can comprise training and retraining the two regressors wherein at least a part of the labelled training data is labelled by one of the two regressors, said at least a part of the labelled training data being used for re-training of the other of the two regressors.

Said user interface can be adapted for receiving at least one of the weight factors.

The features of further advantageous embodiments of the method are specified in the dependent method claims and features of further advantageous embodiments of the apparatus are specified in the dependent apparatus claims.

BRIEF DESCRIPTION OF THE DRAWINGS

Exemplary embodiments of the invention are illustrated in the drawings and are explained in more detail in the following description. The exemplary embodiments are explained only for elucidating the invention, but not limiting the invention's disclosure, scope or spirit defined in the claims.

In the figures.

EXEMPLARY EMBODIMENTS OF THE INVENTION

The invention may be realized on any electronic device comprising a processing device correspondingly adapted. For instance, the invention may be realized in a personal computer or any other suitable computing device.

One aspect of the invention is related to user feedback.

Figure 1:
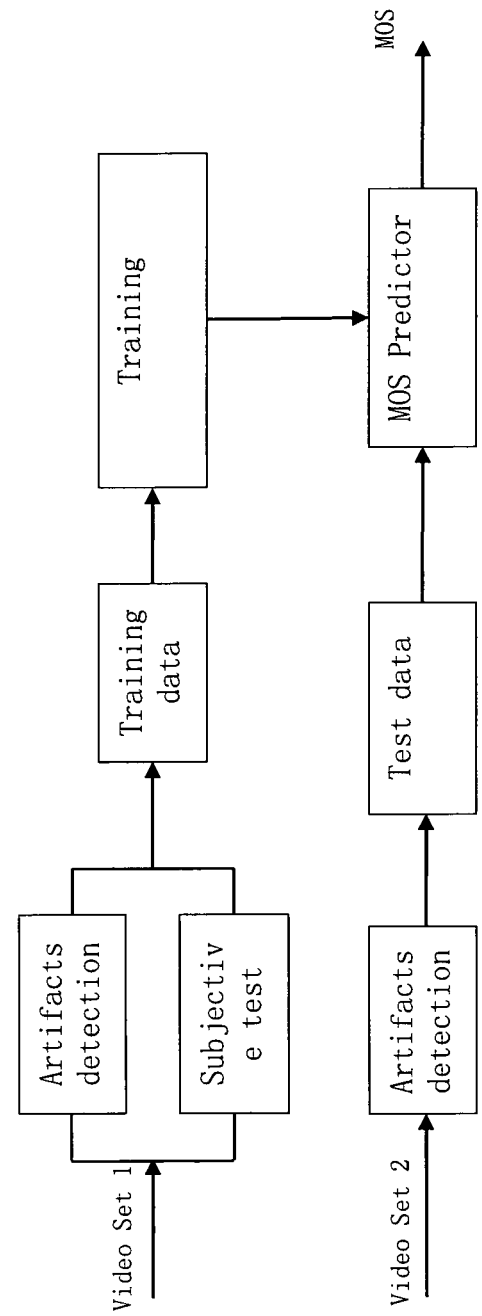
FIG. 1. depicts an exemplary framework of a traditional training-based VQM system.

That is, according to prior art training based VQM systems as exemplarily depicted in FIG. 1, the VQM system is first trained with a training data set comprising at least training artefacts resulting from artefact detection in a video set 1 and subjective labels resulting from labelling of video set 1 by subjects in a subjective test. In a supervised learning system all data in video set 1 is labelled by subjects while in a semi-supervised learning system, at least some video data remains unlabelled. After training has finished, the system is tested, i.e. is used as a mean observer score (MOS) predictor. The test is conducted using test data comprising at least test artefacts resulting from artefact detection in a video set 1. Then, MOS prediction is made based on the test artefacts detected in video set 2. But, if content of video set 2 is unrelated to the content of video set 1, or, if, the video sets differ in variance, significantly, the performance will be weak. In the prior art systems, the predictor is trained and then applied to the test data. Once the predictor is trained, it cannot be changed or adapted to the current test data regardless of supervised or semi-supervised training.

The invention proposes a user interface for presenting a user with predicted MOS, alone, or together with the video set 2. The user interface is configured such that the user can select parts of or the entire video set 2, respectively parts of or the entire test data, in dependence on a user's subjective impression that MOS prediction of the selected part of video set 2 or the test data is not satisfying.

The invention further proposes involving the selection in re-training of the MOS predictor. In an embodiment using a semi-supervised learning system, the selection can be used in re-training as further unlabelled data together with at least a part of the labelled training data, or can be, at least partly, labelled by the user through the interface and then used as labelled data during re-training. If case the test data used for retraining is at least partly labelled by the user, the training data—whether labelled or not labelled—is not necessarily involved in re-training. That is, the invention proposes an embodiment in which test data at least partly labelled by the user is used alone and an embodiment in which test data at least partly labelled by the user is used together with at least a part of the training data, wherein, none, some or all of said at least a part of the training data is labelled.

In embodiments where the test data is used as unlabeled data for re-training, the invention further proposes but does not require employing different weights for original unlabeled data and the test data in order to identify their different contribution. The originally unlabelled data are supposed to be collected and selected according to the entire data distribution while the selected test data does not necessarily reflect this data distribution. Hence, in the re-training, the originally unlabelled data and the test data by feedback should contribute with different significance. Empirically, labelled data are dominant and unlabelled data are auxiliary in the training. So in the re-training, original labelled training data should be with higher weights than original unlabelled training data, and the original unlabelled training data should be with higher weights than unlabelled test data added by user selection.

In an embodiment of the proposed invention, the MOS predictor is originally trained on both labeled and unlabeled data using kNN co-training regression. Then in the user applications, test data which can be provided from a user will be input to the predictor through the software interface, and evaluated and provided with quality scores. If some of test data cannot achieve good prediction, the user can decide to re-train the predictor with some of the test data. Moreover, the user does not need to provide the subjective MOSs as labels. If no label has been provided by the user, the test data will be used as unlabeled data, but they are different from the original unlabeled data. The original unlabeled data are collected according to the entire data distribution, so that the stable performance is kept in most of applications. A few test data from user feedback are not expected to change much. Considering the dominant labelled data, there is an embodiment of the proposed method and of the proposed apparatus where different weights are employed for the labelled data, the original unlabelled data and the test data in the re-training. A weight parameter is introduced in semi-supervised regression, in particular the kNN co-training algorithm, which can be tuned in the re-training. If it is desired that the test data can contribute more to the re-training, they can be with higher weights; and vice versa.

One, some or all of the spatial artefacts: blockiness, blur and noise, can be used to represent objective quality of video frames.

In the classification and regression, co-training is one of the semi-supervised machine learning methods. In each step of the iterative training, each of the learners 'teaches' the other with the few unlabeled examples (and the predicted labels) they feel most confident.

The k-Nearest-Neighbor (kNN) Regression is a simple, intuitive and efficient way to estimate the value of an unknown function in a given point using its values in other (training) points. Let S be a set of training data. The kNN estimator is defined as the mean function value of the nearest neighbors:

$$\tilde{f}(x) = \frac{1}{k} \sum_{x' \in N(x)} f(x')$$

where $$N(x) \subset S$$

is the set of k nearest points to x in S and k is a parameter.

In the kNN regression with co-training, two regressors are trained on artefact features (at least one of: blockiness, blur, and noise) with different distance functions, respectively. Further, each unlabelled data instance is examined by one of the regressors and its MOS is estimated. If the squared error decreases after using this unlabeled data instance with the estimated label (MOS), it can be added to the training data for the other regressor. In each round, the most confident data instance is added to the training set. After the iterative training, the final regressor combining the two kNN regressors gives the MOS predictions.

Figure 2:
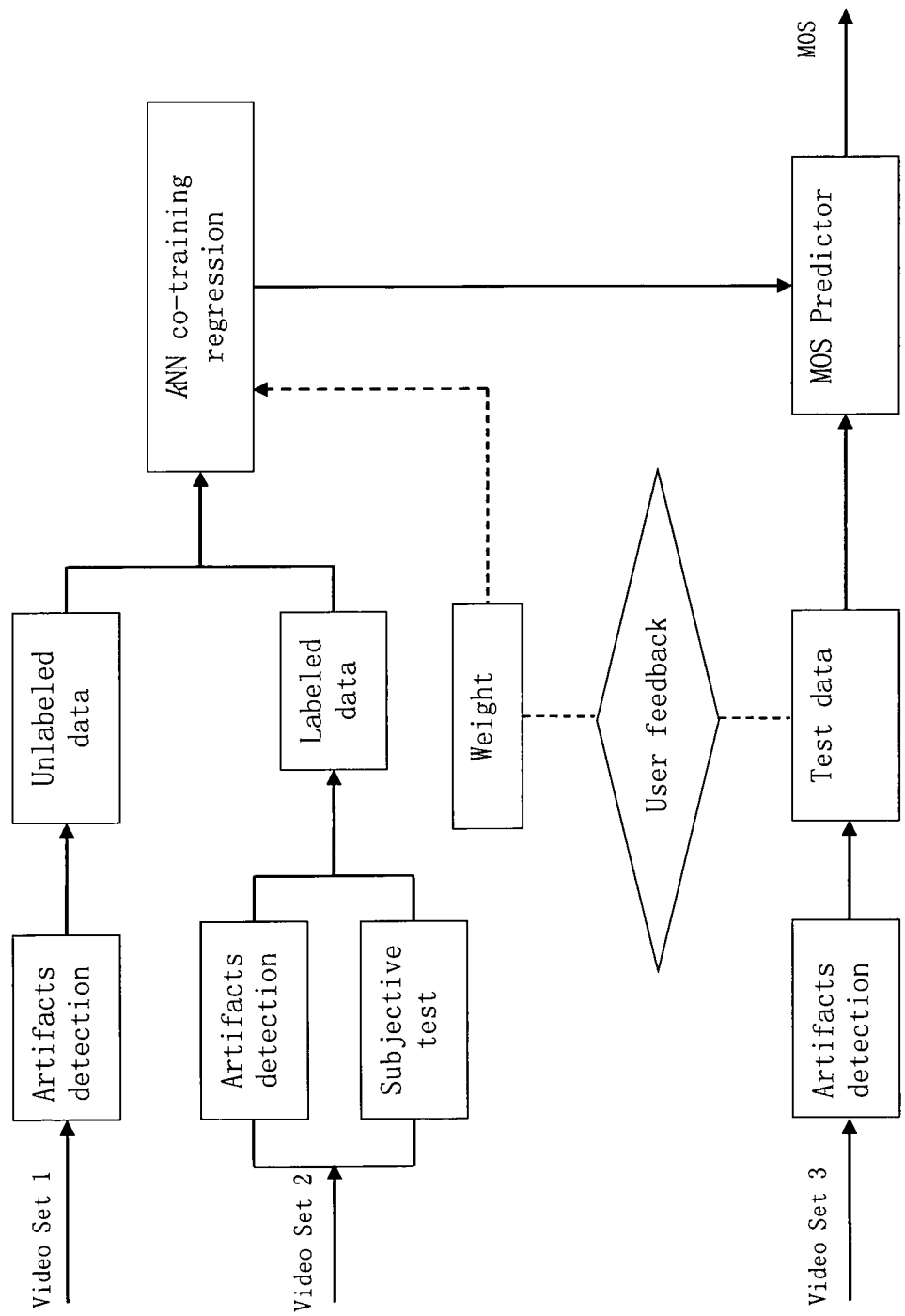
FIG. 2. depicts an exemplary framework of a semi-supervised VQM system with user feedback.

In an embodiment of the invention, the improved kNN co-training regression is provided with user feedback to deal with test data content diversity, as the FIG. 2 shows. Unlike supervised and traditional semi-supervised learning methods (FIG. 1), the proposed method is open for the test data. That means the test data can be used in the training without labels, as the dash line shown in FIG. 2. When the predicted quality scores are not accepted by the user, the user can give feedback through the interface. Then the test data will be used as the unlabeled data to re-train the predictor. Thus three groups of data are involved in the re-training process, the originally labelled, originally unlabeled, and unlabelled test data. However, the reliable degrees of the three groups for the re-training are different. The labelled data are the most reliable. Although they are both unlabelled data, the test data cannot be treated equally as the original unlabelled data. Hence, in an embodiment a parameter weight is proposed to represent the reliability and control the contribution of training data and test data in re-training. In the kNN co-training, the parameter weight can be used in one or both of the following two steps:
(1) the estimation; and
(2) the distance calculation in k nearest neighbour search.

It is assumed that the weight for labelled data is $\alpha$, and the weight for original unlabeled data is $\beta$, and the weight for unlabeled data by feedback (test data) is $\gamma$. Since the labels are fundamental for the training, the labeled data should be with the highest weight. This leads to the constraints:

$$\alpha + \beta + \gamma = 1$$

$$\beta < \alpha$$

$$\gamma < \alpha$$

Considering the previous analysis, the test data should contribute less than the original data; there can be one more constraint:

$$\gamma \leq \beta$$

The specific weight values can be determined according to sample numbers in applications.

If weights are used for estimation, for a data instance, its estimation from kNN regressor will be:

$$\tilde{f}(x) = \frac{1}{Z}\left(\alpha \sum_{x_1 \in N(x)} f(x_1) + \beta \sum_{x_2 \in N(x)} f(x_2) + \gamma \sum_{x_3 \in N(x)} f(x_3)\right)$$

where $N(x) \subset S$ is the set of k nearest points to x, and $x_1$ are labeled data in N(x), $x_2$ original unlabeled data in N(x), and $x_3$ test data by feedback in N(x). If in N(x), the number of $x_1$ is $n_1$, the number of $x_2$ is $n_2$, and the number of $x_3$ is $n_3$, $$Z = n_1\alpha + n_2\beta + n_3\gamma$$

is the normalization factor.

Furthermore, the weights can also be used in the kNN search to control the different data contribution.

If weights are used for distance determination, the distance between two video frames can be calculated as:

$$d = \begin{cases} \alpha^2 \cdot dis(frm_i, frm_j), & \text{if frame } i \text{ and } j \text{ are both labeled data} \\ \beta^2 \cdot dis(frm_i, frm_j), & \text{if frame } i \text{ and } j \text{ are both original unlabeled data} \\ \gamma^2 \cdot dis(frm_i, frm_j), & \text{if frame } i \text{ and } j \text{ are both test data} \\ \alpha \cdot \beta \cdot dis(frm_i, frm_j), & \text{if frame } i \text{ is labeled data, and frame } j \text{ is original unlabeled data} \\ \alpha \cdot \gamma \cdot dis(frm_i, frm_j), & \text{if frame } i \text{ is labeled data, and frame } j \text{ is test data} \\ \beta \cdot \gamma \cdot dis(frm_i, frm_j), & \text{if frame } i \text{ is original unlabeled data, and frame } j \text{ is test data} \end{cases}$$

where $dis(\cdot,\cdot)$ can be any distance metric, such as Euclidean distance or city block distance.

Since the weighted distances could destroy the triangle inequality in distance metric, it is not theoretically strict. At least for this reason, weighted distance is optional in the proposed method.

Figure 3:
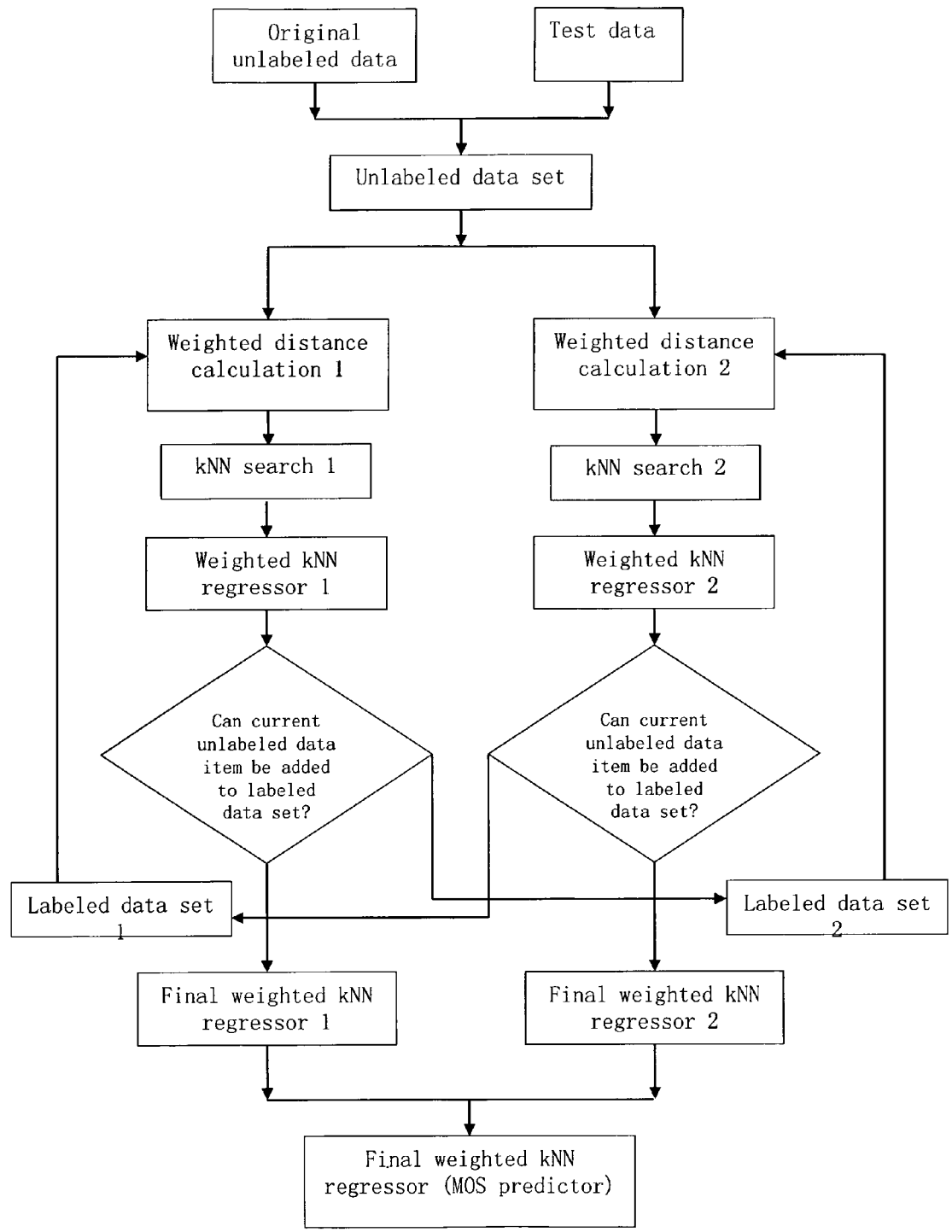
FIG. 3. depicts an exemplary flowchart of kNN co-training regression with data weight.

An exemplary flowchart of the kNN co-training regression re-training with data weights is depicted in FIG. 3.

The invention claimed is:

1. Method for measuring video quality using a semi-supervised learning system for mean observer score prediction, said semi-supervised learning system comprising at least one semi-supervised learning regressor, said method comprising training the learning system and retraining the trained learning system using a selection of test data wherein the test data is used for determining at least one mean observer score prediction using the trained learning system and the selection is indicated by a feedback received through a user interface upon presenting, in the user interface, said at least one mean observer score prediction.

2. Method according to claim 1, wherein said method further comprises receiving a label through said interface and using said label for labelling at least a part of the selection for re-training.

3. Method according to claim 1, said method comprises using training data used for training the learning system for re-training, also, wherein contribution of the selection and the training data for re-training is controlled by a first weight factor assigned to the selection and at least a different second weight factor assigned to the training data.

4. Method according to claim 3, wherein, at least for re-training, the training data comprises labelled and unlabelled training data, said at least a different second weight factor being assigned to the labelled training data and at least a different third weight factor being assigned to the unlabelled training data.

5. Method according to claim 4, further comprising determining a distance between two video frames, each of the two video frames being comprised in either the training data or the test data wherein the distance is determined using a distance metrics and at least one of the first weight factor and the at least a different second weight factor wherein the first weight factor is used, if at least one of the two video frames is comprised in the test data, the at least a different second weight factor is used, if at least one of the two video frames is comprised in the training data, and both, the first and the at least a different second weight factor are used for determining the distance, if one of the two video frames is comprised in the training data and the other is comprised in the test data.

6. Method according to claim 4, further comprising determining an observer score estimate for a data instance using a first neighbourhood of k nearest neighbours in the test data and at least a second neighbourhood of k nearest neighbours in the training data, wherein the observer score estimate is determined using the first weight factor and the at least a different second weight factor.

7. Method according to claim 4, wherein said semi-supervised learning system comprises two semi-supervised learning regressors, said method comprising training and retraining the two regressors wherein at least a part of the labelled training data is labelled by one of the two regressors, said at least a part of the labelled training data being used for re-training of the other of the two regressors.

8. Method according to claim 3, wherein at least one of the first and the at least a different second weight factor is received through said user interface.

9. Apparatus for video quality measurement, said apparatus comprising:
a semi-supervised learning system for mean observer score prediction, said semi-supervised learning system comprising at least one semi-supervised learning regressor,
a user interface for receiving a selection of test data upon presenting at least one mean observer score prediction, said at least one mean observer score prediction being determinable using test data and the learning system, wherein
the semi-supervised learning system is re-trainable using said selection of the test data.

10. The Apparatus of claim 9 adapted for receiving, through the user interface, a label for labelling at least a part of the selection for re-training.

11. The Apparatus of claim 9 adapted for retraining the learning system using said selection together with training data, said training data being used for training the learning system, also, wherein contribution of the selection and the training data for re-training is controlled by weight factors.

12. Apparatus according to claim 11, wherein, at least for re-training, the training data comprises labelled and unlabelled training data, wherein contribution of the selection and the training data for re-training is controlled by a first weight factor assigned to the selection and at least a different second weight factor assigned to the training data.

13. Apparatus according to claim 12, wherein, at least for re-training, the training data comprises labelled and unlabelled training data, said at least a different second weight factor being assigned to the labelled training data and at least a different third weight factor being assigned to the unlabelled training data.

14. Apparatus according to claim 13, further comprising first means for determining a distance between two video frames, each of the two video frames being comprised in either the training data or the test data, wherein said first means are adapted for determining the distance using a distance metrics and at least one of: the first weight factor and the at least a different second weight factor wherein the first weight factor is used, if at least one of the two video frames is comprised in the test data, the at least a different second weight factor is used, if at least one of the two video frames is comprised in the training data, and both, the first and the at least a different second weight factor are used for determining the distance, if one of the two video frames is comprised in the training data and the other is comprised in the test data.

15. Apparatus according to claim 13, further comprising second means for determining an observer score estimate for a data instance using a first neighbourhood of k nearest neighbours in the test data and at least a second neighbourhood of k nearest neighbours in the training data, wherein said second means are adapted for determining the observer score estimate using the first weight factor and the at least a different second weight factor.

16. Apparatus according to claim 12, wherein said semi-supervised learning system comprises two semi-supervised learning regressors, said apparatus being adapted for training and retraining the two regressors wherein at least a part of the labelled training data is labelled by one of the two regressors, said at least a part of the labelled training data being used for re-training of the other of the two regressors.

17. Apparatus according to claim 12, wherein said user interface is further adapted for receiving, at least one of the first and the at least a different second weight factor.

* * * * *